(12) United States Patent
Moon et al.

(10) Patent No.: US 12,316,140 B2
(45) Date of Patent: May 27, 2025

(54) REDUCTION COIL FOR WIRELESS CHARGING AND ELECTROMAGNETIC WAVE REDUCTION APPARATUS INCLUDING REDUCTION COIL

(71) Applicant: ELECTRONICS AND TELECOMMUNICATIONS RESEARCH INSTITUTE, Daejeon (KR)

(72) Inventors: Jung Ick Moon, Daejeon (KR); Sang-Won Kim, Daejeon (KR); Seong-Min Kim, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 662 days.

(21) Appl. No.: 17/496,963

(22) Filed: Oct. 8, 2021

(65) Prior Publication Data

US 2022/0158501 A1    May 19, 2022

(30) Foreign Application Priority Data

Nov. 13, 2020 (KR) .................. 10-2020-0152198

(51) Int. Cl.
*H02J 7/00*    (2006.01)
*H02J 50/12*   (2016.01)
*H02J 50/70*   (2016.01)

(52) U.S. Cl.
CPC .............. *H02J 50/70* (2016.02); *H02J 50/12* (2016.02)

(58) Field of Classification Search
USPC ........................................... 320/108
See application file for complete search history.

(56) References Cited

U.S. PATENT DOCUMENTS

| | | | |
|---|---|---|---|
| 2013/0113297 A1 | 5/2013 | Miyamoto | |
| 2015/0302976 A1* | 10/2015 | Chang | H01F 27/2885 336/84 M |
| 2016/0284465 A1 | 9/2016 | Maniktala | |
| 2017/0141615 A1 | 5/2017 | Moon et al. | |

(Continued)

FOREIGN PATENT DOCUMENTS

| JP | 2013-102593 A | 5/2013 |
|---|---|---|
| JP | 2018-011475 A | 1/2018 |

(Continued)

OTHER PUBLICATIONS

L2013003323 Machine Translation (Year: 2013).*

(Continued)

*Primary Examiner* — Samuel Berhanu
(74) *Attorney, Agent, or Firm* — LRK PATENT LAW FIRM

(57) ABSTRACT

The present disclosure relates to a reduction coil and an electromagnetic wave reduction apparatus including the reduction coil, and more particularly, an electromagnetic wave reduction apparatus including a reduction coil between a transmission coil and a reception coil to reduce, through the reduction coil, unnecessary electromagnetic waves generated in a process of transmitting electromagnetic waves generated by the transmission coil to the reception coil.

14 Claims, 10 Drawing Sheets

(56) References Cited

U.S. PATENT DOCUMENTS

2018/0152049 A1 5/2018 Jeon et al.
2019/0392984 A1* 12/2019 Han .................... H01F 27/2885

FOREIGN PATENT DOCUMENTS

| KR | 10-2013-0033234 A | | 4/2013 |
|----|-------------------|---|--------|
| KR | 20130098099 | * | 9/2013 |
| KR | 10-1364185 B1 | | 2/2014 |
| KR | 10-1789836 B1 | | 10/2017 |
| KR | 10-2019-0143242 A | | 12/2019 |

OTHER PUBLICATIONS

Seonghwan Kim et al., Design and Analysis of a Resonant Reactive Shield for a Wireless Power Electric Vehicle, IEEE Transactions on Microwave Theory and Techniques, vol. 62, No. 4, Apr. 2014.

* cited by examiner

REDUCTION COIL FOR WIRELESS CHARGING AND ELECTROMAGNETIC WAVE REDUCTION APPARATUS INCLUDING REDUCTION COIL

CROSS-REFERENCE TO RELATED APPLICATION

This application claims the benefit of Korean Patent Application No. 10-2020-0152198 filed on Nov. 13, 2020, in the Korean Intellectual Property Office, the entire disclosure of which is incorporated herein by reference for all purposes.

BACKGROUND

1. Field of the Invention

One or more example embodiments relate to a reduction coil and an electromagnetic wave reduction apparatus including the reduction coil, and more particularly, to an electromagnetic wave reduction apparatus including a reduction coil for suppressing electromagnetic waves spatially exposed in a wireless charging system.

2. Description of Related Art

Wireless charging technology refers to technology for charging a battery in a wireless power receiving device by transmitting energy spatially emitted through generating electromagnetic waves between coils. However, the existing wireless charging technology transmits electromagnetic waves formed between a transmission coil and a reception coil wirelessly through the atmosphere of a space and thus, transmits electromagnetic waves to an unintended space, causing a loss of electromagnetic waves. In addition, a transmission/reception circuit that performs wireless charging generates unnecessary electromagnetic waves due to a switching operation.

In particular, when an output of the transmission circuit is high, the intensity of electromagnetic waves radiated to an unintended space exceeds an electromagnetic wave reference value. Thus, a technique for reducing unnecessary electromagnetic waves generated in a transmission and reception circuit or electromagnetic waves for wireless power transmission is very important. In order to solve this issue, a shielding device such as a metallic sheet or ferrite was used to reduce electromagnetic waves.

However, such a method changes the inductance and resistance of the transmission coil and the reception coil and thus, has a side effect of reducing not only electromagnetic waves but also transmission efficiency.

Therefore, there is a need for a method of reducing transmitted electromagnetic waves without using a separate shielding device and without reducing transmission efficiency.

SUMMARY

Example embodiments provide an electromagnetic wave reduction apparatus including a reduction coil for reducing electromagnetic waves while increasing transmission efficiency in a wireless charging system.

Example embodiments provide an electromagnetic wave reduction apparatus including a reduction coil for minimizing a change in impedance formed in a transmission coil and a reception coil of the electromagnetic wave reduction apparatus in a wireless charging system.

According to an aspect, there is provided an electromagnetic wave reduction apparatus including a transmission coil configured to form an electromagnetic field for wireless charging, a reception coil configured to receive the electromagnetic field generated by the transmission coil, and a reduction coil disposed between the transmission coil and the reception coil to reduce an electromagnetic field radiated with a predetermined radius of the transmission coil, wherein the reduction coil may have a form in which a plurality of loops through which currents flow in different directions are coupled in parallel.

The reduction coil may include a first loop through which a current flows in a first direction, and a second loop through which a current flows in a second direction opposite to the first direction.

The first loop may be disposed at a predetermined interval apart from the second loop according to a distance between the transmission coil and the reception coil.

The reduction coil may be configured to form magnetic fields by currents flowing in opposite directions, corresponding to the directions of the currents flowing through the plurality of loops.

The reduction coil may include an open face configured to adjust a shielding degree of the electromagnetic field.

The loops may have a number of turns repeated according to the shielding degree of the electromagnetic field.

The reduction coil may be implemented by circular or rectangular loops, wherein loops of the same shape or different shapes may be coupled in parallel.

According to an aspect, there is provided an electromagnetic wave reduction apparatus including a transmission coil configured to form an electromagnetic field for wireless charging, a reception coil configured to receive the electromagnetic field generated by the transmission coil, a reduction coil disposed between the transmission coil and the reception coil to reduce an electromagnetic field radiated with a predetermined radius of the transmission coil, and a capacitor disposed on an open face of the reduction coil to adjust a shielding degree of the electromagnetic field.

The reduction coil may include a first loop through which a current flows in a first direction, and a second loop disposed at a predetermined interval from the first loop, the second loop through which a current flows in a second direction opposite to the first direction.

The reduction coil may include an open face configured to adjust a shielding degree of the electromagnetic field.

The capacitor may be coupled to at least one of an open face formed in the first loop and an open face formed in the second loop.

A size of the capacitor may be changed such that a resonant frequency of the reduction coil may be lower than a transmission frequency of the transmission coil.

The size of the capacitor may be determined by at least one of a position of the reduction coil, an interval of open faces formed in the reduction coil, and an inductance of the reduction coil.

According to an aspect, there is provided a reduction coil including a first loop through which a current flows in a first direction to reduce an electromagnetic field generated by a transmission coil of a wireless charging system, and a second loop through which a current flows in a second direction opposite to the first direction, wherein the first loop and the second loop may be disposed in parallel at a predetermined interval apart from each other according to a distance between the transmission coil and a reception coil.

The first loop and the second loop may be formed respectively on open faces configured to adjust a shielding degree of the electromagnetic field, and have a number of turns repeated according to the shielding degree of the electromagnetic field.

The first loop and the second loop may be coupled to a capacitor configured to adjust a resonant frequency of the reduction coil.

The first loop and the second loop may be implemented by circular or rectangular loops, wherein loops of the same shape or different shapes may be coupled in parallel.

Additional aspects of example embodiments will be set forth in part in the description which follows and, in part, will be apparent from the description, or may be learned by practice of the disclosure.

According to example embodiments, an electromagnetic wave reduction apparatus may include a reduction coil for reducing electromagnetic waves while increasing transmission efficiency in a wireless charging system.

According to example embodiments, an electromagnetic wave reduction apparatus may include a reduction coil for minimizing a change in impedance formed in a transmission coil and a reception coil of the electromagnetic wave reduction apparatus in a wireless charging system.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
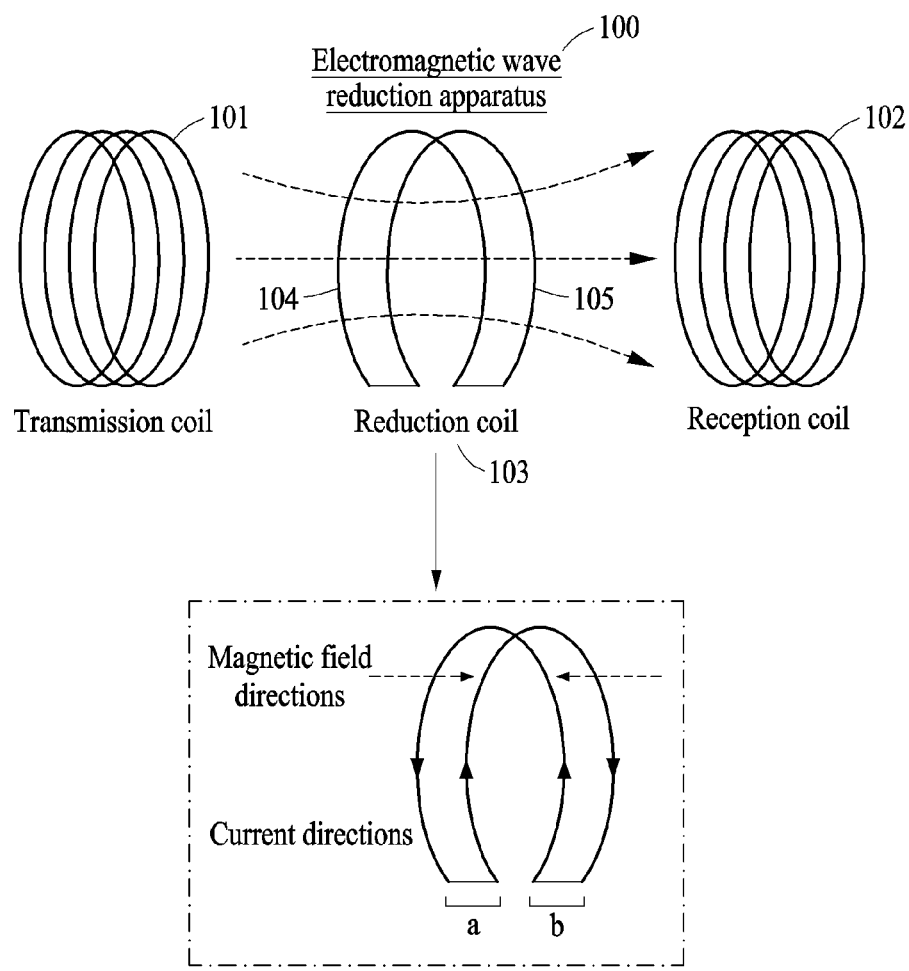
FIG. 1 is a diagram illustrating an electromagnetic wave reduction apparatus including a reduction coil between a transmission coil and a reception coil according to an example embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an electromagnetic wave reduction apparatus including a reduction coil between a transmission coil and a reception coil according to an example embodiment.

Referring to FIG. 1, a coil structure for reducing electromagnetic waves in a wireless charging system may be applied to an electromagnetic wave reduction apparatus 100. The electromagnetic wave reduction apparatus 100 may reduce electromagnetic waves without reducing the efficiency of transmission performed between a transmission coil 101 and a reception coil 102 in the wireless charging system. To this end, the electromagnetic wave reduction apparatus 100 may include a reduction coil 103 between the transmission coil 101 and the reception coil 102. The reduction coil 103 may be implemented in a form in which loops spaced apart at a predetermined interval are arranged.

Since the arrangement structure of the electromagnetic wave reduction apparatus 100 is located on a path along which electromagnetic waves move between the transmission coil 101 and the reception coil 102, a burden on the wireless charging system by impedance may be small. In detail, an impedance may occur according to the transmission of electromagnetic waves between the transmission coil 101 and the reception coil 102, and the higher the impedance, the lower the efficiency of transmission of electromagnetic waves.

Accordingly, to increase the transmission efficiency in the wireless charging system, the reduction coil 103 may be disposed on the path between the transmission coil 101 and the reception coil 102. This arrangement structure may minimize a change in impedance caused by the reduction coil 103, and lower the burden applied to the wireless charging system. Accordingly, the present disclosure may increase the transmission efficiency between the transmission coil 101 and the reception coil 102.

More specifically, the electromagnetic wave reduction apparatus 100 may include the transmission coil 101, the reception coil 102, and the reduction coil 103. In detail, the transmission coil 101 may form an electric field or magnetic field (hereinafter, an electromagnetic field) for wireless charging. The electromagnetic field formed by the transmission coil 101 may be transmitted to the reception coil 102 along the path between the transmission coil 101 and the reception coil 102 of the electromagnetic wave reduction apparatus 100. In this case, the electromagnetic field may be radiated to an unintended space on a wireless charging space.

The present disclosure may add the reduction coil 103 between the transmission coil 101 and the reception coil 102 to minimize an electromagnetic field radiated to an unintentional space. The reduction coil 103 may be disposed between the transmission coil 101 and the reception coil 102 to reduce an electromagnetic field radiated with a predetermined radius of the transmission coil 101. The reduction coil 103 may include open faces a and b for adjusting a shielding degree of the electromagnetic field.

The reduction coil 103 may be implemented in a form in which a first loop 104 and a second loop 105 are coupled in parallel. Also, currents may flow through the loops in opposite directions. In other words, the electromagnetic field formed by the transmission coil 101 may cause a current to flow through the first loop 104 in a first direction. In addition, a current may flow through the second loop 105 in a second direction opposite to the first direction in which the current flows through the first loop 104. In addition, the loops may form magnetic fields in opposite directions. In other words, the magnetic fields formed by the loops may be in opposite directions, corresponding to the directions in which the currents flow through the loops.

Accordingly, the electromagnetic wave reduction apparatus 100 may include a reduction coil between a transmission coil and a reception coil, thereby reducing, through the reduction coil, unnecessary electromagnetic waves generated in the process of transmitting electromagnetic waves output from the transmission coil to the reception coil.

Figure 2A:
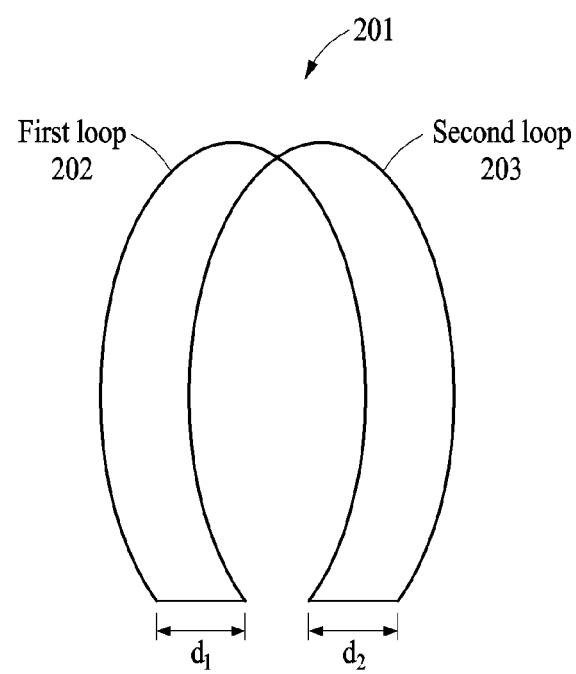
FIGS. 2A and 2B illustrate a distance between loops constituting a reduction coil and a size of open faces of the loops according to an example embodiment.
Figure 2B:
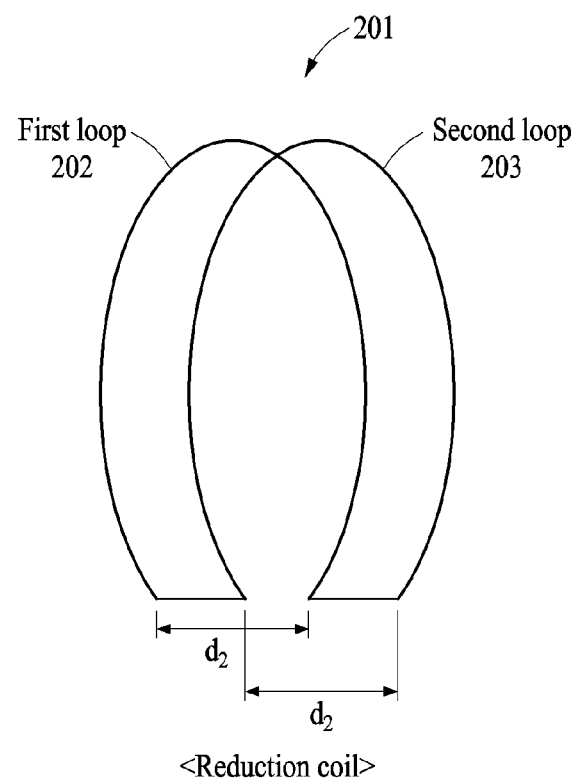

FIGS. 2A and 2B illustrate a distance between loops constituting a reduction coil and a size of open faces of the loops according to an example embodiment.

Referring to FIG. 2A, a reduction coil 201 may be implemented in a form in which a first loop 202 and a second loop 203 are coupled in parallel. Here, the first loop 202 may be disposed at a predetermined interval from the second loop 203, and a distance $d_1$ between the first loop 202 and the second loop 203 may be adjusted according to a distance between a transmission coil and a reception coil.

Referring to FIG. 2B, the reduction coil 201 may include open faces for adjusting a shielding degree of an electromagnetic field. The open faces may be adjusted according to the external shapes of the first loop 202 and the second loop 203. In other words, the reduction coil 201 may be implemented in various forms according to a wavelength or a frequency of the electromagnetic field. The reduction coil 201 may be implemented by loops of the same shape or various different shapes according to its purpose. As an example, the loops constituting the reduction coil 201 may be implemented in geometric shapes such as circular, rectangular, or triangular shapes.

Accordingly, the size of an open face, that is, a distance $d_2$ of each loop of the reduction coil 201 may be adjusted in various manners according to the shapes of the loops to increase the transmission efficiency.

Figure 3A:
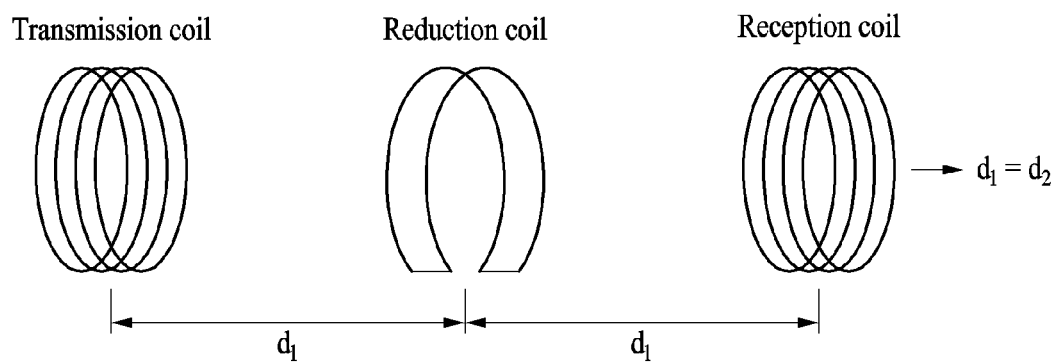
FIGS. 3A to 3C illustrate positions of a reduction coil disposed between a transmission coil and a reception coil according to an example embodiment.
Figure 3B:
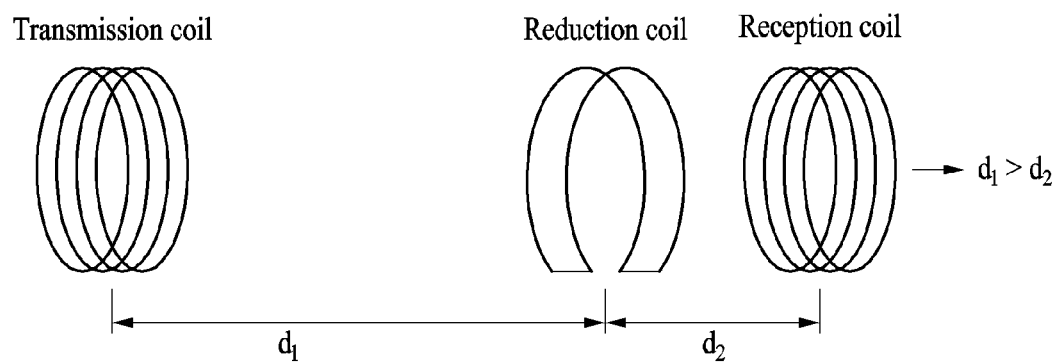
Figure 3C:
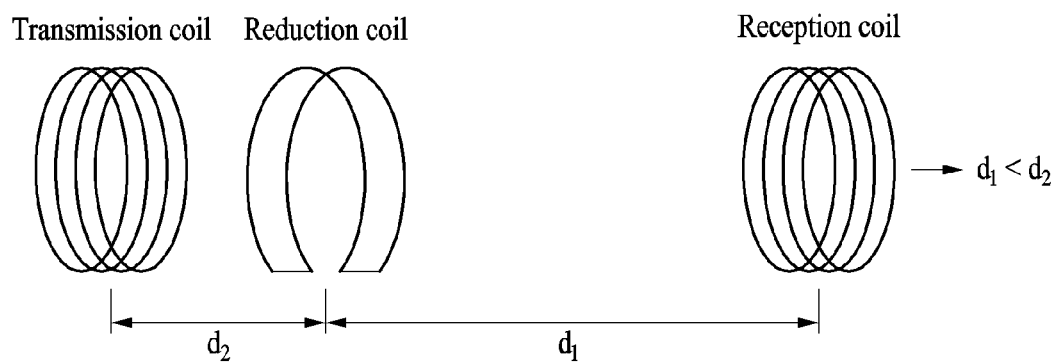

FIGS. 3A to 3C illustrate positions of a reduction coil disposed between a transmission coil and a reception coil according to an example embodiment.

Referring to FIGS. 3A to 3C, a reduction coil may be disposed between a transmission coil and a reception coil. The reduction coil may be disposed between the transmission coil and the reception coil, at a different position according to an electromagnetic field reduction effect. In addition, the position of the reduction coil may be adjusted according to the number of repetitions of a periodic shape of a frequency or a wavelength during a vibration unit.

In detail, the reduction coil may be positioned halfway between the transmission coil and the reception coil as shown in FIG. 3A. The reduction coil may be positioned between the transmission coil and the reception coil, at a position closer to the reception coil than the transmission coil as shown in FIG. 3B. The reduction coil may be positioned between the transmission coil and the reception coil, at a position closer to the transmission coil than the reception coil as shown in FIG. 3C.

Figure 4:
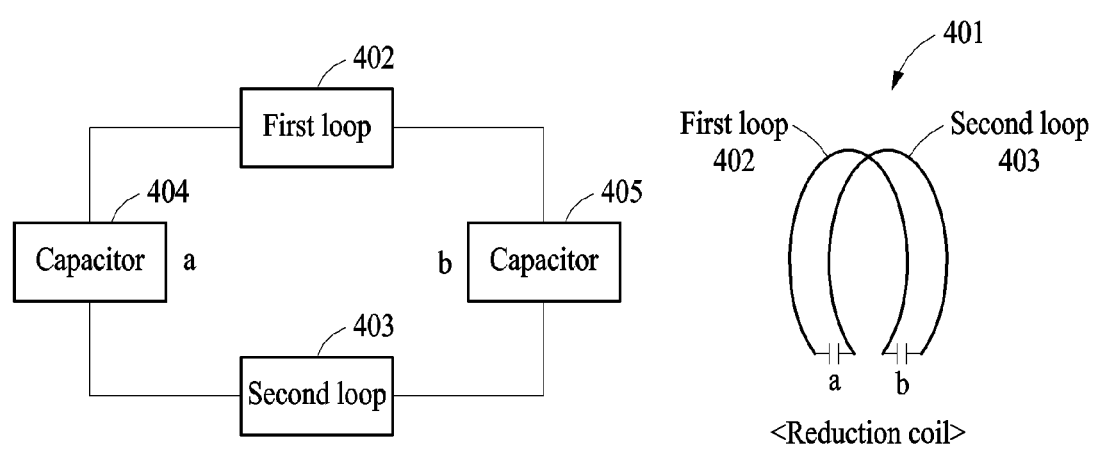
FIG. 4 is a diagram illustrating capacitors coupled to open faces of loops constituting a reduction coil according to an example embodiment.

FIG. 4 is a diagram illustrating capacitors coupled to open faces of loops constituting a reduction coil according to an example embodiment.

FIG. 4 is a circuit diagram of a reduction coil including a capacitor, wherein an electromagnetic wave reduction apparatus may include a transmission coil, a reception coil, a reduction coil 401, and capacitors 404 and 405. Here, the reduction coil 401 may include a first loop 402 and a second loop 403. The capacitors 404 and 405 may be disposed on open faces of the reduction coil 401 for adjusting a shielding degree of an electromagnetic field. In addition, the capacitors 404 and 405 may be coupled to at least one of an open face formed in the first loop 402 and an open face formed in the second loop 403.

In detail, capacitors 404 and 405 may be attached to portions a and b shown in FIG. 4. Here, the capacitors 404 and 405 may be attached to the reduction coil 401 to maximize an electromagnetic wave reduction effect of a wireless charging system. In this case, the capacitors 404 and 405 may be attached to one or both of the portions a and b shown in FIG. 4. In addition, shorting a portion to which the capacitors 404 and 405 are not attached may reduce a change in impedance.

A size of the capacitors 404 and 405 may be set differently according to a position of the reduction coil 401 disposed between the transmission coil and the reception coil, a distance between the first loop 402 and the second loop 403 constituting the reduction coil 401 (the length of the portion a or b), and an inductance of the coil. In setting the size of the capacitors 404 and 405, the present disclosure may set the range of the capacitors 404 and 405 such that a resonant frequency of the reduction coil 401 may be lower than a transmission frequency, and optimize the range while observing an electromagnetic wave reduction effect.

Figure 5A:
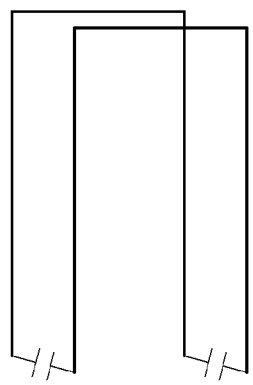
FIGS. 5A to 5C illustrate reduction coils implemented in various forms according to an example embodiment.
Figure 5B:
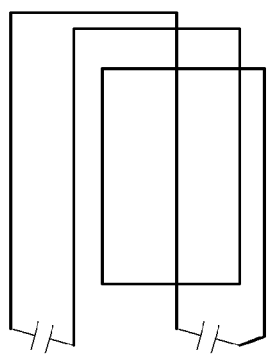
Figure 5C:
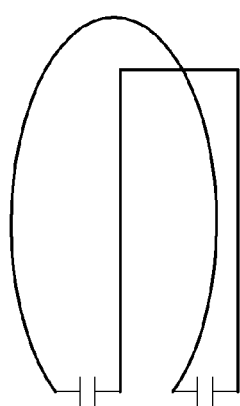

FIGS. 5A to 5C illustrate reduction coils implemented in various forms according to an example embodiment.

Referring to FIGS. 5A to 5C, a reduction coil may include loops of various shapes that are connected in parallel according to a wavelength or a frequency of electromagnetic waves generated by a transmission coil included in an electromagnetic wave coil apparatus. As an example, the shape of the loops in the reduction coil and/or the number of turns of the loops may be determined in consideration of the number of repetitions of a periodic shape of a frequency or a wavelength during a vibration unit.

In detail, the reduction coil may be implemented by loops of the same shape or various different shapes according to its purpose. Here, the loops constituting the reduction coil may be implemented in geometric shapes such as circular, rectangular, or triangular shapes. Accordingly, the reduction coil may include loops of the same rectangular shape that are arranged in parallel at a predetermined interval as shown in FIG. 5A, or include loops of different shapes, for example, a rectangular loop and a circular loop, that are arranged in parallel at a predetermined interval as shown in FIG. 5C.

In addition, the number of turns of the loops of the reduction coil may be determined in various manners. Here, the number of turns of the loops of the reduction coil may be determined differently according to a vibration unit of a wavelength or a frequency. That is, the reduction coil may include loops of the same shape disposed in succession in a manner that the number of turns of one loop increases as shown in FIG. 5B. The loops of the reduction coil disposed in succession may be formed in different sizes according to the number of turns of each loop.

As an example, the present disclosure may reduce the number of turns of the loops of the reduction coil when a period of a wavelength or a magnetic field generated by the transmission coil is long. The present disclosure may increase the number of turns of the loops of the reduction coil when the period of the wavelength or the magnetic field generated by the transmission coil is short. Accordingly, the present disclosure may adjust the number of turns of the loops according to the period, thereby increasing the efficiency of transmission of electromagnetic waves output to a wireless charging space and reducing the electromagnetic waves.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

What is claimed is:

1. An electromagnetic wave reduction apparatus comprising:
    a transmission coil configured to form an electromagnetic field for wireless charging;
    a reception coil configured to receive the electromagnetic field generated by the transmission coil; and
    a reduction coil disposed between the transmission coil and the reception coil to reduce an electromagnetic field radiated with a predetermined radius of the transmission coil,
    wherein the reduction coil has a form wherein at least a first loop and a second loop are positioned to face each other and a first end of the first loop and a first end of the second loop are connected, and a second end of the first loop and a second end of the second loop are connected,
    whereby the first loop and the second loop are connected in parallel, and current flows in opposite directions through each loop,
    wherein a first magnetic field produced by the first loop is directed towards the second loop and a second magnetic field produced by the second loop is directed towards the first loop, wherein the first and second magnetic fields substantially cancel each other,
    wherein turns of the first loop and the second loop are determined based on a period of the wavelength or the magnetic field generated by the transmission coil, and the first loop and the second loop of the reduction coil disposed in succession are formed in different sizes.

2. The electromagnetic wave reduction apparatus of claim 1, wherein the first loop is disposed at a predetermined interval apart from the second loop according to a distance between the transmission coil and the reception coil.

3. The electromagnetic wave reduction apparatus of claim 1, wherein the reduction coil comprises an open face configured to adjust a shielding degree of the electromagnetic field.

4. The electromagnetic wave reduction apparatus of claim 3, wherein the loops have a number of turns repeated according to the shielding degree of the electromagnetic field.

5. The electromagnetic wave reduction apparatus of claim 1, wherein the reduction coil is implemented by circular or rectangular loops, wherein loops of the same shape or different shapes are coupled in parallel.

6. An electromagnetic wave reduction apparatus comprising:
    a transmission coil configured to form an electromagnetic field for wireless charging;
    a reception coil configured to receive the electromagnetic field generated by the transmission coil;
    a reduction coil disposed between the transmission coil and the reception coil to reduce an electromagnetic field radiated with a predetermined radius of the transmission coil; and
    a capacitor disposed on an open face of the reduction coil to adjust a shielding degree of the electromagnetic field,
    wherein the reduction coil has a form wherein at least a first loop and a second loop are positioned to face each other and a first end of the first loop and a first end of the second loop are connected, and a second end of the first loop and a second end of the second loop are connected,
    whereby the first loop and the second loop are connected in parallel,
    whereby current flows in opposite directions through each loop,
    wherein a first magnetic field produced by the first loop is directed towards the second loop and a second magnetic field produced by the second loop is directed towards the first loop,
    wherein the first and second magnetic fields substantially cancel each other,
    wherein turns of the first loop and the second loop are determined based on a period of the wavelength or the magnetic field generated by the transmission coil, and the first loop and the second loop of the reduction coil disposed in succession are formed in different sizes.

7. The electromagnetic wave reduction apparatus of claim 6, wherein the reduction coil comprises an open face configured to adjust a shielding degree of the electromagnetic field.

8. The electromagnetic wave reduction apparatus of claim 7, wherein the capacitor is coupled to at least one of an open face formed in the first loop and an open face formed in the second loop.

9. The electromagnetic wave reduction apparatus of claim 6, wherein a size of the capacitor is changed such that a resonant frequency of the reduction coil is lower than a transmission frequency of the transmission coil.

10. The electromagnetic wave reduction apparatus of claim 9, wherein the size of the capacitor is determined by at least one of a position of the reduction coil, an interval of open faces formed in the reduction coil, and an inductance of the reduction coil.

11. A reduction coil comprising:

a first loop through which a current flows in a first direction; and a second loop through which a current flows in a second direction, wherein the first loop and the second loop are disposed in parallel at a predetermined interval apart from each other according to a distance between the transmission coil and a reception coil, wherein the first loop and the second loop are disposed in a form wherein at least a first loop and a second loop are positioned to face each other and a first end of the first loop and a first end of the second loop are connected, and a second end of the first loop and a second end of the second loop are connected, whereby the first loop and the second loop are connected in parallel, and current flows in opposite directions through each loop, wherein a first magnetic field produced by the first loop is directed towards the second loop and a second magnetic field produced by the second loop is directed towards the first loop, wherein the first and second magnetic fields substantially cancel each other, wherein turns of the first loop and the second loop are determined based on a period of the wavelength or the magnetic field generated by the transmission coil, and the first loop and the second loop of the reduction coil disposed in succession are formed in different sizes.

12. The reduction coil of claim 11, wherein the first loop and the second loop are formed respectively on open faces configured to adjust a shielding degree of the electromagnetic field, and have a number of turns repeated according to the shielding degree of the electromagnetic field.

13. The reduction coil of claim 12, wherein the first loop and the second loop are coupled to a capacitor configured to adjust a resonant frequency of the reduction coil.

14. The reduction coil of claim 11, wherein the first loop and the second loop are implemented by circular or rectangular loops, wherein loops of the same shape or different shapes are coupled in parallel.

* * * * *